United States Patent [19]
Horan, Jr. et al.

[11] 3,928,197
[45] Dec. 23, 1975

[54] POLLUTION CONTROL SYSTEM FOR WATER SUPPLY

[75] Inventors: Raymond E. Horan, Jr.; Floyd M. Nash, both of Little Rock, Ark.

[73] Assignee: Jacuzzi Bros. Incorporated, Little Rock, Ark.

[22] Filed: Feb. 14, 1974

[21] Appl. No.: 442,360

Related U.S. Application Data

[63] Continuation of Ser. No. 93,770, Nov. 30, 1970, abandoned.

[52] U.S. Cl. ................ 210/62; 210/64; 210/101
[51] Int. Cl.² .......................................... C02B 3/08
[58] Field of Search ....... 210/62, 97, 101, 110, 115, 210/127, 129, 205, 206; 137/88, 89; 222/93–105

[56] References Cited
UNITED STATES PATENTS

| | | | |
|---|---|---|---|
| 417,046 | 12/1889 | Kendrick | 210/101 |
| 1,277,378 | 9/1918 | Case | 210/101 X |
| 2,210,719 | 8/1940 | Hodges | 210/129 |
| 2,999,797 | 9/1961 | Cambell | 210/62 X |
| 3,133,877 | 5/1964 | Mixer et al. | 210/62 |
| 3,220,552 | 11/1965 | Staats | 210/127 X |
| 3,270,920 | 9/1966 | Nessler | 222/94 X |
| 3,586,627 | 6/1971 | Gooch | 210/62 X |

FOREIGN PATENTS OR APPLICATIONS

| | | | |
|---|---|---|---|
| 250,757 | 9/1962 | Australia | 210/101 |
| 444,326 | 10/1912 | France | 210/205 |

*Primary Examiner*—John Adee
*Attorney, Agent, or Firm*—Edward Brosler

[57] ABSTRACT

A water system in which chlorine is proportionally supplied at a rate which will not render the water unpalatable, the water thus chlorinated, being filtered through a filter, said system, from the addition of said chlorine until it reaches service having a traversal rate at the maximum contemplated draw of water from the system, sufficient to enable the chlorine at the prevailing concentration, to thoroughly destroy all existing germs. Automatic starting of flow upon opening of a service line, and the provision of automatic backwashing for the filter, render the system entirely automatic.

2 Claims, 4 Drawing Figures

INVENTORS
RAYMOND E. HORAN JR.
FLOYD M. NASH
BY Edward Brosler
ATTORNEY

INVENTORS
RAYMOND E. HORAN JR.
FLOYD M. NASH
BY Edward B. rosler
ATTORNEY

POLLUTION CONTROL SYSTEM FOR WATER SUPPLY

This is a continuation of application Ser. No. 93,770, filed Nov. 30, 1970 and now abandoned.

Our invention relates generally to liquid flow systems wherein a mixing of chemicals occurs, and more particularly to polution control in a water system wherein chlorine is mixed with the water to render it safe for drinking purposes.

While, as previously indicated, the system of the present invention is of general utility, the invention will be described as applied for use as a pollution control in a water system, because when so applied, the invention serves a real need over and above the mere function of mixing chemicals in a liquid flow system.

Small communities, trailer camps, established camp sites, often face a real problem in providing a supply of water free of pollution and suitable for drinking purposes. The source of water supply may be a pond or stream where contamination prevails and unless such water is properly treated, great risk attends its use, and a potentially dangerous health problem exists.

Among the objects of our invention are;

1. To provide a novel and improved liquid flow system having improved means for mixing liquid ingredients therein;
2. To provide a novel and improved pollution control system for water supply, involving the use of a disinfectant such as chlorine or the like;
3. To provide a novel and improved water system in which a disinfectant such as chlorine is added at a substantially maintained ratio of disinfectant to water;
4. To provide a novel and improved water system which supplies clean pure potable water for drinking purposes;
5. To provide a novel and improved potable water system which is completely automatic in its operation; and
6. To provide a novel and improved receptacle assembly constituting an important component of the aforementioned system.

Additional objects of our invention will be brought out in the following description of a preferred embodiment of the same, taken in conjunction with the accompanying drawings wherein, FIG. 1 is a view in elevation depicting the invention as embodied in a pollution free water system;

Figure 4:
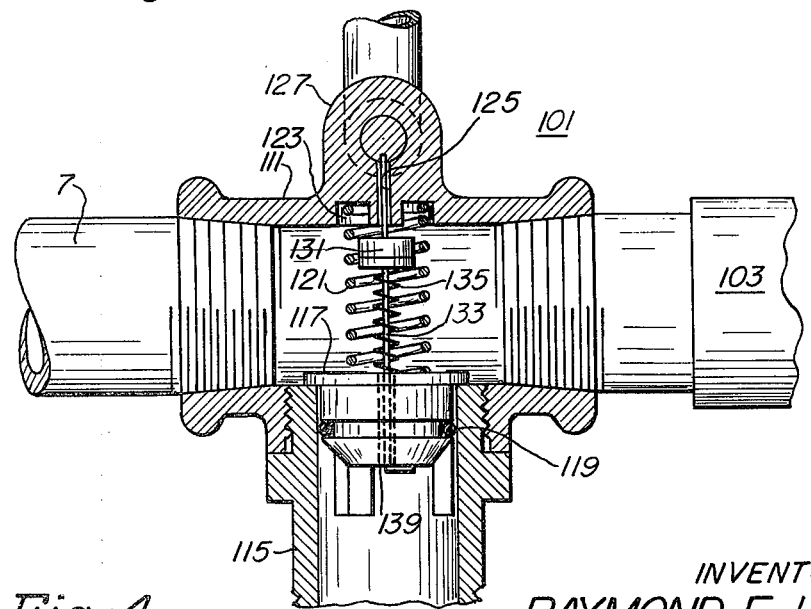

FIG. 4 is a view in section through a valve assembly utilized in an automatic starting arrangement forming the subject matter of a co-pending application in the name of FLOYD M. NASH for Tankless Automatic Water System, Ser. No. 28637, filed Apr. 15, 1970, and employed to advantage in the system of the present invention in its preferred form.

Referring to the drawings for details of the preferred form of the present invention, as employed to provide a potable water system, the system involves a pump 1 driven by a motor 3, the pump being provided with a suction line 5 for connection to the source of water supply (not shown), and a discharge line 7 which leads to a filter 9, the output of the filter then being conducted by a service line 11 to one or more service outlets which would normally be valve controlled.

As one step in the purification of the water derived from such supply source, we provide a receptacle assembly 13, used as a chlorinator and so designed and so coupled into a flow line of the system such as the pump discharge line 7, as to automatically supply chlorine to the water at a ratio which is substantially unaffected by the flow rate in the flow line, which flow rate would vary with demands of service. Expressed in another way, the supply of chlorine to the water will be substantially porportional to the demands upon the system.

Toward achieving this desirable mixing characteristic in this system, the receptacle assembly 13 involves an outer container 15 of any suitable material, though preferably of fiber glass, having an opening at its upper end, into which is threadedly secured a closure 17, formed with a depending neck 19. A collapsible bag 21 of non-porous plastic or other suitable material is secured to the neck 19 in any appropriate manner.

The closure extends above the upper end of the container to present an exposed cylindrical wall 23. A flow passageway 25 through the closure, terminates at its lower end, exposed to the region between the collapsible bag and the container, and at its upper end in the exposed wall of the closure, this latter end being enlarged and threaded.

To the lower portion of this passageway, is attached a flexible tube 27 of a length sufficient to extend substantially to the bottom of the container.

An additional passageway 29 through the closure, similar to the other passageway 25, but differing in that the lower end terminates within the mouth of the collapsible bag, is provided, and to the lower end of the passageway, there is attached to the closure, a similar flexible tube 31 extending substantially to the bottom region of the collapsible bag.

The receptacle assembly as thus far described, is made ready for coupling into the water system by providing a flow connection 35 from a location 39 in the flow line from the pump discharge, to that passageway 25 in the closure leading to the flexible tube 27.

Likewise, a flow connection 40 is established from the passageway 29 in the closure 17, leading to the interior of the collapsible bag, said flow connection being to a location 44 in the flow line 7, but downstream of the first location 39, to establish a pressure differential between the two flow connections 39 and 41. Such pressure differential is a function of the pressure drop in the flow line, and of course, this will vary with service demands on the system.

To increase such pressure differential, and without extending the distance between the locations of connection of these two flow lines 35 and 40, a venturi 45 is installed in the flow line 7 at the location 41 of the flow connection of lower pressure.

When so connected, water from pump discharge in the flow line 7 will enter the receptacle assembly in the region between the collapsible bag and the container via the flexible tube 27, and build up pressure in such region.

If the collapsible bag contains a liquid, in this case a chlorine solution, then the water under pressure about this bag will transmit such pressure to the bag contents and the liquid in the flow connection from the bag to the venturi. If the system is quiescent, as when there is no service demand on the system, then the pressure will equalize throughout the entire system and no differential pressure will exist between the two locations 39 and 41 in the flow line 7 to which the receptacle assembly 13 is connected.

Upon establishment of a demand for service, a pressure differential will accordingly be established between such two locations, and the resulting dominant pressure developed about the collapsible bag will cause a discharge of contents from the bag, with the accompanying partial collapsing of the bag, as the contents are discharged therefrom. In order to control such discharge and meter the flow of the chlorine solution into the water at a desired rate, which will vary substantially porportionally to the flow of water in the flow line 7 to maintain a substantial constant ratio between the two, a metering valve assembly 51 is installed in this flow connection 40, which is made adjustable in order to establish the desired ratio.

The metering valve assembly 51, may be of any suitable type, though I prefer a plug type assembly including a housing 53 having provisions for an adjustable tapered plug 55, the housing and plug having registerable passages therethrough. The housing may be of glass and the plug of teflon. A screw 56 threaded axially through the small end of the plug, may be manipulated to adjust the size of the passage through this valve.

The flexible tubes 27 and 31, being of light weight, in addition to being flexible, might in the absence of precautionary measures, move around haphazardly during functioning of the apparatus, and in the process cause a blocking of flow therethrough. As a deterent to such possibilities, each of the tubes has applied to its free end, a multi-directional flow fitting 57 which will not only assure an open discharge end for the tube to which it is attached, but the weight thereof will tend to discourage blocking of the flow through the tube, due to kinking or the like.

Once the ratio of chlorine solution to water has been established by adjustment of the metering valve, it will be apparent that as the flow of water increases, the pressure differential across the chlorinator will likewise increase, thus pumping more chlorine solution into the water in the flow line, and thus tending to maintain a substantially constant ratio of chlorine to water.

Provision is made for refilling the collapsible bag when the contents of the bag has dimished to the point where refilling becomes necessary.

Toward this end, an axial fill passageway 61 is provided through the closure, the lower end of this passageway where it faces into the collapsible bag, being enlarged to provide a valve housing 63. A ball float valve 65 is retained in this housing by a diametrically installed pin 67 whereby, in the presence of water or other liquid in which the ball will float, the ball float valve will float against the valve seat to block the passageway.

Such closing of the valve will occur so long as there is adequate contents in the collapsible bag, or so long as there exists pressure about the bag. In the absence of both of these two conditions, the ball valve will drop from its valve seat to be supported by the pin, and liquid may be supplied to the bag through the passageway 61 until the liquid level rises to the point of lifting the ball valve against its valve seat.

To facilitate such filling of the bag, a cylindrical wall 69 may be mounted on the closure to form with the closure, a funnel or hopper 71 into which the liquid may be poured for filling the bag. A cover 73 may be applied to the hopper when not in use.

In preparation for such a refilling operation, the pressure passageway 25 should be effectively blocked or otherwise isolated from the pressure in the flow line 7, which can readily be realized by installing in such passageway, a ball or plug valve assembly 75, which will permit shutting off the supply of water under pressure, and in conjunction therewith, the liquid trapped between the collapsible bag and the inner wall of the container must be provided with an escape route to permit the empty bag to expand as the bag is being replenshed with chlorine solution.

To take care of this, an additional passageway 79 is provided through the closure, such passageway being like the passageway 25 but displaced 90° therefrom. The exposed end of this passageway is interiorly threaded to receive a pipe fitting including a plug valve assembly 83, to which is connected a discharge pipe 85.

Thus by shutting the valve assembly 75 in the pressure line 35, and opening the valve in the valve assembly 83 connecting the interior of the container to atmosphere, the receptacle assembly is conditioned for filling of the collapsible bag. Following a filling operation, these valves may then be reversed as to position, to place the assembly in condition for operation.

The system as described, may be provided with automatic backwash apparatus 91 associated with the filter 9, to automatically clean the filter when cleaning is necessary. Such backwash apparatus may be of the character illustrated and described in the co-pending application of FLOYD M. NASH et al for Automatic Valve Assembly for Swimming Pool Type Filter, Ser. No. 848,195, filed Aug. 7, 1969, such automatic valve assebly being symbolically illustrated in FIG. 1 of the drawing. In lieu of that depicted and which is fully described in the aforementioned co-pending application, one might employ for automatic backwash, the invention illustrated and described in the patent to FLOYD M. NASH for Automatic Filter Backwash Assembly U.S. Pat. No. 3,513,644 of May 19, 1970, which serves the same purpose.

A system of the type described will be designed to handle the maximum service requirements of the community or group which it is to serve. To render such a system potable, that is capable of supplying drinking water which is both palatable and safe, it is an important feature of the present invention to be able to accomplish this in a rather unique manner. Toward this end, one adjusts the ratio of chlorine solution to water to a value which can be effective in the killing of existing germs and yet not render the water unpalatable.

In a system, where the filter output goes directly to service, one then selects a filter of such size that the minmum traversal time for water passing through the filter at the maximum anticipated draw rate for the particular system, when added to the traversal time of flow from the filter to service, which is apt to be minor, will be such as to allow for the prevailing concentration of the chlorine in the water to disinfect the water completely before reaching service. With such relationship established, the water will never be overcharged with chlorine, and accordingly will always be palatable, and with assurance that the water will also always be safe for drinking purposes.

If the system utilizes a storage tank, the traversal time from the filter discharge to service may thereby be substantially increased, whereby a filter having a smaller traversal time may be utilized. Such a system would satisfy requirements for a lower maximum anticipated draw rate, and would offer the advantage of a smaller pump to handle service and backwash requirements.

With the automatic chlorinator and the automatic filter backwash features in the system, the system may be made completely automatic by the incorporation therein of means for automatically discharging water upon opening of a service line. While this may be accomplished by pressurizing the system through the utilization of conventional type pressure tanks and the like, the use of pressure tanks and the like with their associated problems can be avoided and, at the same time, minimize the overall physical structure and installation of the system.

Figures 2, 3:
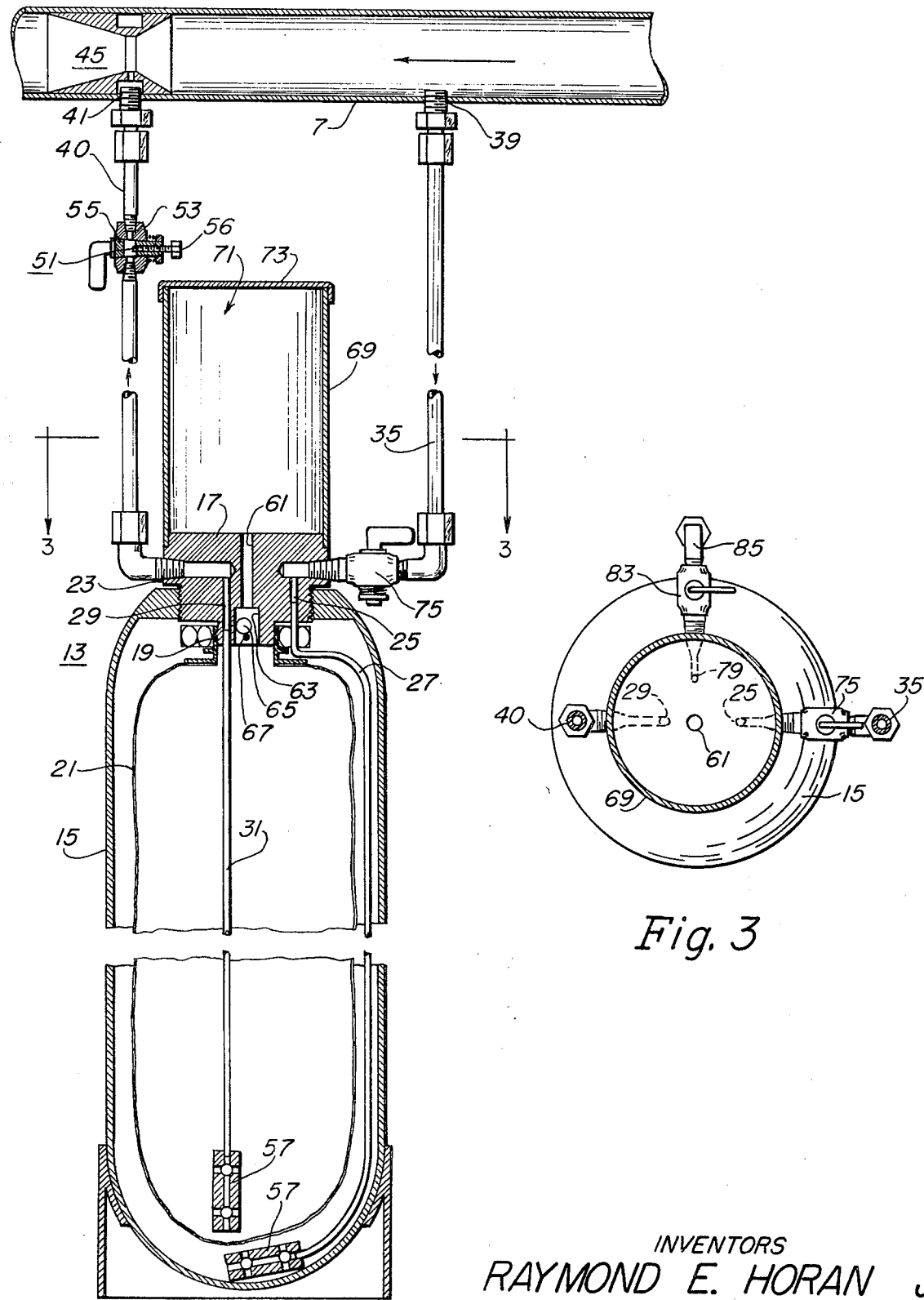
FIG. 2 is a view in section through a receptacle assembly functioning as a chlorinator in the system of FIG. 1.
FIG. 3 is a view taken in the plane 3—3 of FIG. 2.

With this in mind, there is incorporated into the system, automatic starting apparatus 97 which is more fully illustrated and described in the copending application of FLOYD M. NASH for TANKLESS AUTOMATIC WATER SYSTEM, Ser. No. 28,637 and filed Apr. 15, 1970. In such system, a pressure switch 99 is coupled directly into the service connected line 7 through a valve assembly 101 such as illustrated in FIG. 3, while a variable pressure device is flow connected directly to the service connected line 7 without any intermediate valving.

The variable pressure device, in its most simplified form, involves an inflatable tube 105 closed at one end and enclosed within a protective housing 107, with a threaded opening for coupling the same to a pipe or fitting. The device is made quite small to provide a rapid change in pressure when deflating from its maximum permissible expanded condition to its normal deflated condition. It is too small to provide adequate storage capacity for any water system, and in fact, is sufficiently small to effectively discharge in response to each normal service demand.

In this valve assembly, the valve body 111 has a through passageway, to one end of which is coupled the variable pressure device 103, and to the other end of which is connected the service connected or discharge line 7. Intermediate the ends of this passageway is an opening for coupling a flow connection 115 from the pump. Spanning this connection is a closing valve 117 including an O-ring seal 119, the valve being urged to its seating position by a compression spring 121 bearing against the roof of the valve housing in a circular recess 123 provided for the spring.

Centrally of the circular recess is a passage 125 through the wall of the valve housing, the passage terminating in a fitting 127 cast integral with the housing and having a threaded opening to which the pressure switch 99 may be coupled, to place it in pressure communication with the interior of the valve housing.

A disc valve 131, adjacent the entrance to the passage 125, is axially mounted on a length of wire 133 which at one end passes centrally through the closing valve 117, where it is precluded from being withdrawn by a bend in the wire. At its other end, the wire freely enters the passage 125. A coil spring 135 under compression between the closing valve 117 and the disc valve 131, serves to stabilize the disc valve and assure proper functioning thereof.

A leak flow path 139 between the wire 133 and the closing valve 117, permits of the over travel of this valve which flows the initial sealing contact by the O-ring seal 119 during closing of this valve.

The installed location of the disc valve on the wire is such, that it will open following the initial sealing and during this overtravel of the closing valve, thus exposing the pressure switch to pressure conditions in the service connected line 7.

In the open position of the closing valve, as when the pump is supplying service, the disc valve will be in seating position against the proximate end of the passage 125, thereby cutting off the pressure switch from the conditions existing within the service line.

Figure 1:
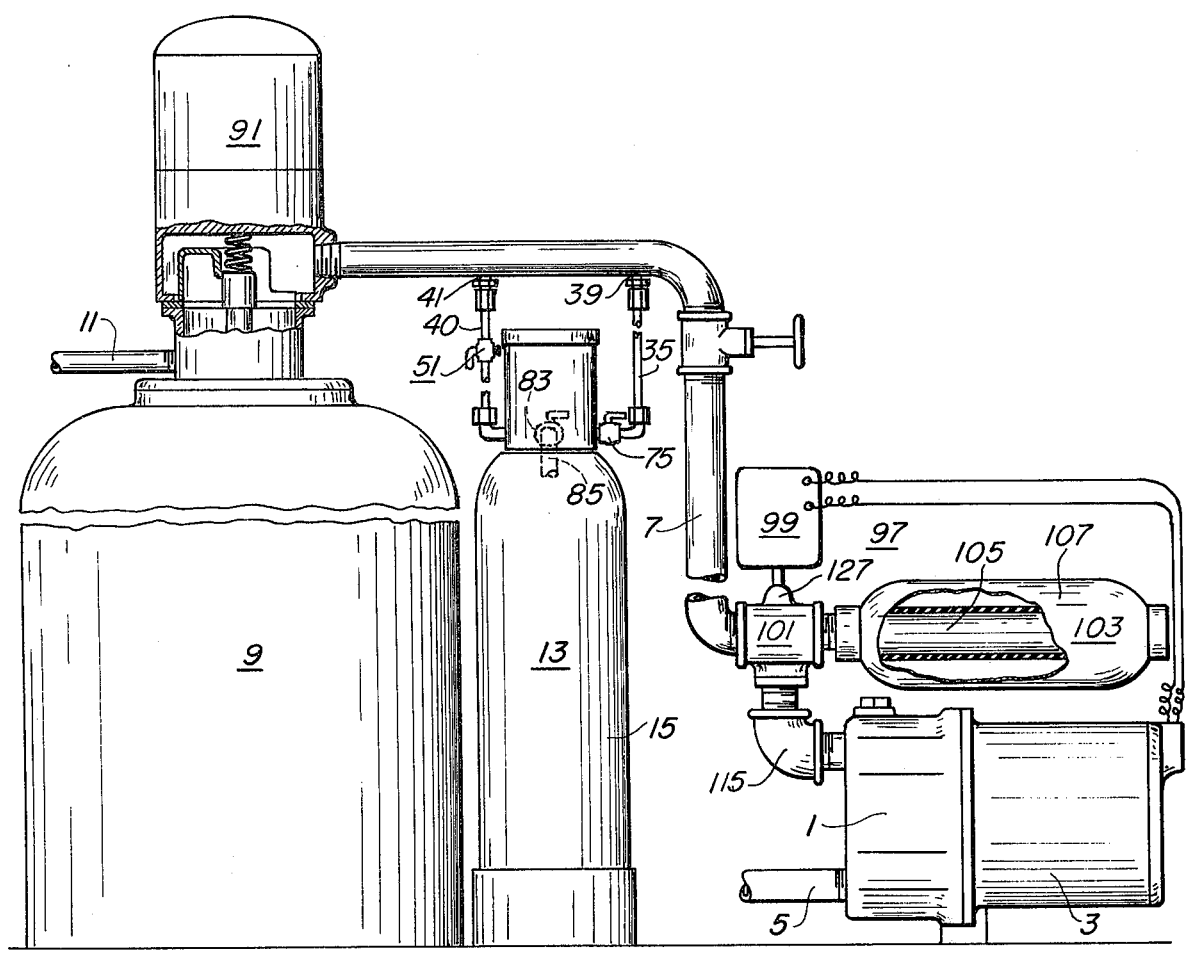

In the operation of the system of FIG. 1, it will be observed that, in the quiescent condition of the system, the closing valve 117 will be in its seating position, with the pressure switch exposed to the pressure conditions existing in the variable pressure device 103.

Upon opening a service line, the variable pressure device, will promptly discharge and drop in pressure to the value which will cause the pressure switch to connect the pump motor and start the pump, whereby the resulting opening of the closing valve to supply service, will bring about a closing of the disc valve to disconnect the pressure switch from the pressure conditions existing in the service line.

In this system, the variable pressure device being fully exposed to the pressure conditions in the service line, will immediately recharge to the prevailing pressure in the service line, whereby, upon a subsequent closing of the service line, its pressure will have reached a value sufficient to operate the pressure switch. The closing of the valve 117 opens the disc valve 131 and the variable pressure device, being now pressure coupled to the pressure switch, will immediately disconnect the pump motor to shut down the pump.

From the foregoing description of our invention in its preferred form, it will become apparent that the same fulfills all the objects thereof in providing a pollution control system for water supply, while in general providing a means for mixing liquids in a desired ratio despite a variable draw on the system.

We accordingly do not desire to be limited in our protection to the specific details illustrated and described except as may be necessitated by the appended claims.

I claim:

1. The method of supplying safe and palatable water to service from a water system having a pump, coupled to a source of contaminated water and a service line, comprising predetermining the degree of contamination of said water, then determining a ratio of flow rate of an added disinfectant to flow rate of said water which will, after an exposure period of time, render said water safe without rendering said water unpalatable, supplying said disinfectant to said water in such system at substantially said aforementioned ratio of disinfectant flow rate to water flow rate, despite changes in flow rate of water, by-passing a part of said flow through a container parallel with said service line and having a collapsible bag therein, said bag being compressed to deliver said disinfectant in said ratio, and retaining said disinfectant in contact with said water, before discharge to service, for at least a period of time equal to said exposure time.

2. The method in accordance with claim 1, characterized by starting said pump in response to a demand for service from such system.

* * * * *